United States Patent [19]

Lenz et al.

[11] Patent Number: 4,687,813

[45] Date of Patent: Aug. 18, 1987

[54] PRODUCTION OF COATINGS

[75] Inventors: Werner Lenz, Bad Duerkheim; Hans Sander, Ludwigshafen; Dieter Moeller, Ascheberg, all of Fed. Rep. of Germany

[73] Assignee: BASF Aktiengesellschaft, Ludwigshafen, Fed. Rep. of Germany

[21] Appl. No.: 817,757

[22] Filed: Jan. 6, 1986

Related U.S. Application Data

[63] Continuation of Ser. No. 624,292, Jun. 25, 1984, abandoned.

[30] Foreign Application Priority Data

Jun. 24, 1983 [DE] Fed. Rep. of Germany ....... 3322829

[51] Int. Cl.$^4$ .............................................. C08F 8/30
[52] U.S. Cl. ................................. 525/131; 525/123; 525/124; 525/258; 525/265
[58] Field of Search ............... 525/123, 124, 258, 265, 525/131

[56] References Cited

U.S. PATENT DOCUMENTS

| | | | |
|---|---|---|---|
| 3,394,111 | 7/1968 | Liebsch | 260/77.5 |
| 3,542,741 | 11/1970 | Hartmann et al. | 260/77.5 |
| 3,549,583 | 12/1970 | Nagata et al. | 260/37 |
| 3,919,218 | 11/1975 | Schmitt et al. | 260/248 |
| 3,932,342 | 1/1976 | Nagata | 524/441 |
| 4,145,513 | 3/1979 | Dalibor | 528/75 |
| 4,246,132 | 1/1981 | Gras et al. | 252/182 |
| 4,288,586 | 9/1981 | Bock et al. | 528/67 |
| 4,293,661 | 10/1981 | Probst et al. | 525/127 |
| 4,306,051 | 12/1981 | Gras et al. | 528/45 |
| 4,368,320 | 1/1983 | Aldinger et al. | 528/355 |
| 4,382,114 | 3/1983 | Hohlein et al. | 428/423.1 |
| 4,456,744 | 6/1984 | Kamatani et al. | 528/71 |

FOREIGN PATENT DOCUMENTS

| | | |
|---|---|---|
| 1044932 | 2/1965 | United Kingdom . |
| 1216479 | 12/1967 | United Kingdom . |
| 1391066 | 7/1971 | United Kingdom . |

*Primary Examiner*—Lewis T. Jacobs
*Assistant Examiner*—A. L. Carrillo
*Attorney, Agent, or Firm*—Keil & Weinkauf

[57] ABSTRACT

A process for the production of coatings based on reaction products of (A) polyhydroxypolyacrylate resins obtained from hydroxyalkyl esters of acrylic acid and/or methacrylic acid, alkyl esters of acrylic acid and/or methacrylic acid, and one or more polymerizable, olefinically unsaturated nitrogen-containing heterocyclic compounds, with or without vinylaromatics, (meth)acrylamides and other monomers, with (B) isocyanurate-containing polyisocyanates which may or may not contain biuret groups, have a functionality of from 2.5 to 6 and consist of a mixture of polyisocyanates possessing predominantly cycloaliphatically bonded isocyanate groups with those possessing predominantly aliphatically bonded isocyanate groups.

The process is particularly useful for coating metal components.

20 Claims, No Drawings

PRODUCTION OF COATINGS

This application is a continuation of application Ser. No. 624,292, filed on June 25, 1984, now abandoned.

The present invention relates to a process for the production of coatings using coating agents which contain, as binders, reaction products of selected polyhydroxypolyacrylate resins with polyisocyanates which contain isocyanurate groups and may contain biuret groups, may be partially or completely blocked with CH—, NH— or OH—acidic blocking agents, have a functionality of from 2.5 to 6 and contain isocyanate groups which are predominantly cycloaliphatically bonded but some of which are aliphatically bonded.

German Laid-Open application No. DOS 1,720,265 describes a process for the preparation of light-stable coatings based on reaction products of polyhydroxypolyacrylate resins prepared by copolymerization of monoesters of an acrylic acid and/or methacrylic acid with polyfunctional aliphatic alcohols, esters of acrylic acid and/or methacrylic acid with monofunctional aliphatic alcohols and/or other copolymerizable olefinically unsaturated monomers in organic solution. The binder combinations described here, consisting of hydroxyl-containing acrylic resins and a biuretized triisocyanate give highly glossy flexible pigmented surface-coating films which possess excellent stability to weather and harden rapidly at low temperatures, the resulting film being scratch-resistant. However, a disadvantage of these surface coating mixtures is that the biuretized triisocyanates used have a tendency to decompose once again into the parent diisocyanate monomers and moreover have a pronounced toxicity when inhaled in the form of spray mists, so that these triisocyanates are unacceptable from the point of view of industrial hygiene.

German Published Application DAS 1,669,008 discloses that a mixture of a hydroxyl-containing copolymer based on methyl methacrylate, vinyl aromatics, monoacrylates and/or monomethacrylates of alkanols, other copolymerizable olefinically unsaturated monomers, monomers containing one or more hydroxyl groups in the molecule and a monomer containing tertiary amino groups with one or more polyisocyanates in organic solution can be used as a surface coating. These surface coating mixtures give hard, scratch-resistant, tough films which are stable to weather, exhibit good adhesion, are resistant to water, solvents and chemicals and possess high gloss. The hardeners listed in this case include aromatic and aliphatic polyisocyanates which contain urethane, isocyanurate and biuret groups. However, there is no mention of isocyanurate-containing polyisocyanates which are substantially acceptable from the point of view of industrial hygiene and contain predominantly cycloaliphatically bonded isocyanate groups. Monomers containing tertiary amino groups which are mentioned are those possessing highly basic aliphatic tertiary amino groups. Although this accelerates the reaction between the polyisocyanate and the polyol, the surface coating film must be expected to have relatively low resistance to acids and a strong tendency to yellow on weathering.

German Published applications Nos. DAS 1,668,510, DAS 2,054,239, DAS 2,603,259, DAS 2,626,900 and DAS 2,659,853 and German Laid-Open application Nos. DOS 2,460,329 and DOS 2,851,613 likewise describe processes for the preparation of organic solutions of hydroxyl-containing copolymers, and for the production of coatings from binders based on these copolymers in combination with aliphatic biuretized triisocyanates. For the stated copolymers, suitable hydroxyl-containing acrylate monomers are reaction products of acrylic acid and/or methacrylic acid with a glycidyl ester of a branched aliphatic carboxylic acid of 4 to 26 carbon atoms and, if appropriate, hydroxyalkyl acrylates or methacrylates where alkyl is of 2 to 4 carbon atoms, and suitable comonomers are esters of acrylic acid and/or methacrylic acid with alkanols of 1 to 12 carbon atoms and styrene or alkylstyrene. The introduction of side hydroxyl groups via the glycidyl ester is effected by incorporating acrylic acid and/or methacrylic acid as copolymerized units and at the same time esterifying the carboxyl groups with the glycidyl compound.

These binder combinations, too, can be used to produce highly glossy, rapidly curing, scratch-resistant, water-resistant, flexible surface coating films which are very stable to weather. However, the disadvantage once again is the fact that in this case too the above biuretized triisocyanates are used, which are not completely acceptable from the point of view of industrial hygiene.

German Laid-Open application No. DOS 2,836,612 describes a process for the production of coatings based on binders consisting of surface coating polyisocyanates which contain biuret, urethane or isocyanurate groups and hydroxyl-containing acrylate copolymers obtained from hydroxyalkyl acrylates or methacrylates where hydroxyalkyl is of 2 to 4 carbon atoms, and substituted or unsubstituted styrene and/or methyl methacrylate, esters of acrylic acid and/or methacrylic acid with alcohols of 1 to 12 carbon atoms, mono- or dicarboxylic acids which may or may not be $\alpha$, $\beta$-monoolefinically unsaturated and acrylonitrile and/or methacrylonitrile. The particular advantages of this process are that these binder combinations give clear, highly compatible surface coating mixtures as well as glossy, rapidly drying, hard and sufficiently flexible surface coating films. In order to realize these advantageous performance characteristics, especially the good compatibility with isocyanurate-containing polyisocyanates, it is absolutely necessary to use from 5 to 30% by weight of acrylonitrile and/or methacrylonitrile as comonomers in the hydroxyl-containing acrylic resin. However, the use of such nitrile-containing copolymers in two-component polyurethane surface coatings leads to substantial yellowing on prolonged thermal loading, and to chalking of the pigmented surface coating film on weathering. The description also states that, as one of the preferred surface coating polyisocyanates, it is possible to use, inter alia, an isocyanurate-containing polyisocyanate based on IPDI, ie. containing predominantly cycloaliphatically bonded isocyanate groups, in combination with the acrylic resins. However, such binder combinations are not described in the Examples, nor does the description of German Laid-Open application No. DOS 2,836,612 give any indication of the flexibility, the increase in hardness as a function of time, and in particular the resistance of the surface coating films to premium grade gasoline after a certain curing time, the latter property being extremely important with regard to the use of the surface coatings for automotive repair.

German Laid-Open application No. DOS 2,900,592 describes reaction products of glycidyl-containing acrylic resins and hydroxyl-containing secondary monoamines, the acrylic resins being random copolymers of glycidyl acrylate and/or methacrylate, vinylaromatics, methyl methacrylate, acrylonitrile, methacrylonitrile, esters of acrylic acid with alcohols of 1 to 12 carbon atoms and/or esters of methacrylic acid with alcohols of 2 to 12 carbon atoms, with or without hydroxyalkyl acrylates and/or methacrylates where hydroxyalkyl is of 2 to 4 carbon atoms and mono- and/or dicarboxylic acids which may or may not be $\alpha$, $\beta$-monoolefinically unsaturated, and are used as crosslinking components in combination with polyisocyanates which can also possess isocyanurate groups. Thus, the acrylic resin component claimed in this application inevitably contains tertiary amino groups, in addition to predominantly secondary hydroxyl groups, as functional groups. In addition to the good compatibility of these binder combinations with aromatic solvents, the pot lives, which are surprisingly long in spite of the presence of tertiary amino groups, are especially noteworthy. As will readily be apparent to one skilled in the art, these long pot lives of the surface coating mixtures are attributable in particular to the fact that the acrylic resins virtually exclusively contain secondary hydroxyl functions as reactive groups. Hence, it is also in no way surprising that the corresponding reaction product which is described in the Comparative Example, is based on diethanolamine and contains primary hydroxyl groups gives an excessively short pot life with polyisocyanates compared with the copolymers described in this laid-open application. In the process described, it is therefore not possible to obtain acrylic resins which can be readily used for two-component polyurethane surface coatings and contain large amounts of primary hydroxyl groups in addition to tertiary amino groups. Moreover, binders which contain strongly basic amino-containing copolymers have the disadvantages that their acid-resistance —which is absolutely necessary, for example, for topcoats for automotive repair—is relatively low, and that, compared with amino-free systems, they exhibit pronounced yellowing on prolonged weathering.

German Laid-Open application No. DOS 3,010,719 relates to a process for the production of metallic effect coatings having improved weather-resistance, in which the topcoats used are clear finishes whose binders essentially contain, as the polyol component, inevitably polyesterols which have a low aromatics content and, if appropriate, polyacrylate-polyols, and contain, as the polyisocyanate component, adducts which contain biuret groups and/or isocyanurate groups and possess aliphatic isocyanate groups which may or may not be blocked. The clear finishes described in this application possess, in particular, high crack resistance on weathering. However, the description states that the mixtures are preferably used when the surface coating is cured with the action of heat, since these conditions result in homogeneous clear surface coating films (cf. Example 6; baking temperature: 80° C.). However, surface coatings which are particularly suitable for the automotive repair sector must also be capable of being cured without difficulty at room temperature and give homogeneous coatings in this case. A further general disadvantage of the combinations, described in this application, of polyester polyols having a low aromatics content with polyisocyanates is the fact that such systems exhibit relatively slow surface drying and thorough drying at room temperature in comparison with the polyacrylatepolyol/polyisocyanate combinations, which dry rapidly and are then resistant to premium grade gasoline. Accordingly, the surface coating mixtures described in the Examples of German Laid-Open application No. DOS 3,010,719 all harden only at 80° C., ie. at elevated temperature.

German Laid-Open application No. DOS 3,027,776 relates to a process for the preparation of hydroxyl-containing (meth)acrylic resins which are modified with δ-caprolactone and can be crosslinked with polyisocyanates. These copolymers, even when combined with an isocyanurate-containing polyisocyanate based on isophorone diisocyanate and containing predominantly cycloaliphatically bonded isocyanate groups, give hard, weather-resistant, flexible coatings which exhibit good adhesion to metal and are resistant to water and to chemicals. However, the systems described have the disadvantage that they have to be baked at elevated temperatures (from 110 to 150° C.) if cycloaliphatic polyisocyanates are used, ie. they are unsuitable for surface coatings for automotive repair.

German Laid-Open application No. DOS 3,137,133 relates to a process for the production of coatings by reacting polyhydroxypoly(meth)acrylate resins, prepared from hydroxyalkyl acrylates or methacrylates which have primary hydroxyl groups and in which the alkylene main chain is of 4 to 10 carbon atoms and special acrylates or methacrylates as comonomers, with isocyanurate-containing polyisocyanates which possess predominantly cycloaliphatically bonded isocyanate groups. As a result of the use of the special polyisocyanates, the surface coatings obtained from the stated components have very low toxicity when inhaled and give non-yellowing, acid-resistant coatings which are very useful as topcoats for automotive repair, are cured at low temperatures and possess high flexibility, scratch-resistance, final hardness and stability to weather. The rate at which these surface coating films are cured at room temperature, and their resistance to premium grade gasoline, satisfy practical requirements, but in some cases do not quite reach the standard of the most advantageous prior art binder systems, for example those based on hydroxyl-containing polyacrylate resins and biuret-containing aliphatic polyisocyanates.

In contrast to the biuretized aliphatic polyisocyanates preferably used to date in topcoats for automotive repair, isocyanurate-containing polyisocyanates possessing predominantly cycloaliphatically bonded isocyanate groups, preferably products prepared by trimerization of 3-isocyanatomethyl-3,5,5-trimethylcyclohexyl isocyanate (=isophorone diisocyanate) in accordance with British Patent 1,391,066 and German Laid-Open applications Nos. DOS 2,325,826 and DOS 2,732,662, possess extremely low toxicity when inhaled, even in the form of aerosols; this is very advantageous with regard to their use as surface coatings for automotive repair.

Combinations of cycloaliphatic isocyanurate-containing polyisocyanates and minor amounts of polyisocyanates which contain biuret and/or isocyanurate groups and possess aliphatically bonded isocyanate groups, preferably compounds based on hexamethylene diisocyanate, are substantially more advantageous than, for example, pure biuretized aliphatic polyisocyanates in terms of their industrial hygiene properties. The same also applies to, for example, the polyisocyanates described in German Laid-Open application No. DOS 3,033,860, which are prepared by trimerization of a mixture of 3-isocyanatomethyl-3,5,5-trimethylcyclohexyl isocyanate with a minor amount of hexamethylene diisocyanate. In combination with suitable polyols, all of the stated polyisocyanates give surface coating films which are very stable to weather and have a low tendency to yellow.

If the prior art hydroxyl-containing polyacrylate resins, as described in, for example, the above German Published applications Nos. DAS 1,669,008, DAS 1,668,510, DAS 2,054,239, DAS 2,603,259, DAS 2,626,900 and DAS 2,659,853 and German Laid-Open applications Nos. DOS 2,460,329 and DOS 2,851,613, ie. those based on hydroxyalkyl acrylates and/or methacrylates where the main chain of the alcohol radical is of 2 or 3 carbon atoms, with or without adducts of glycidyl esters of a branched aliphatic monocarboxylic acid with acrylic acid and/or methacrylic acid, are combined with these isocyanurate-containing polyisocyanates which contain predominantly cycloaliphatically bonded isocyanate groups and may or may not furthermore contain biuret groups, the surface coating films obtained within curing times which are conventional in practice and at any curing temperature conventionally employed for coating in automotive repair, ie. from room temperature to 80° C., possess inadequate mechanical properties and in some cases insufficient resistance to premium grade gasoline. If acrylic resins having a high hydroxyl number (>100) and predominantly consisting of monomers which give homopolymers having a high glass transition temperature (>20° C.) are used, the surface coating films obtained under curing conditions conventionally used in practice (about 7 days at room temperature or not more than 30–60 minutes at 80° C.) have adequate scratch-resistance and in some cases sufficient resistance to gasoline but are much too brittle, ie. they do not satisfy practical requirements. The use of acrylic resins which have a lower hydroxyl number (<100) and contain large amounts of monomer units which give homopolymers having a low glass transition temperature (<5° C.) accordingly results in surface coating films which possess adequate flexibility but whose scratch-resistance and resistance to premium grade gasoline are too low to satisfy practical requirements. Although the use of larger amounts of catalyst results in some cases in films having improved flexibility as well as improved scratch-resistance, these films do not harden rapidly enough to give gasoline-resistant coatings. Moreover, the pot lives of the corresponding surface coating mixtures are too short.

Like the above combinations, two-component surface coatings consisting of the polyhydroxypolyacrylate resins described in German Laid-Open application No. DOS 1,720,265 and isocyanurate-containing polyisocyanates which contain predominantly cycloaliphatically bonded isocyanate groups and may or may not contain biuret groups give films which have inadequate flexibility. If the polyhydroxypolyacrylates described in German Laid-Open application No. DOS 2,836,612, which inevitably contain nitrile side groups, are combined with the above polyisocyanates, the resulting surface coating films are, as stated above, useless as topcoats for automotive repair and have an excessive tendency to yellow and insufficient stability to weather. In combination with these polyisocyanates, the acrylic resins claimed in German Laid-Open application No. DOS 2,900,592, which inevitably possess both hydroxyl and tertiary amino groups, present problems in that the surface coating films have insufficient resistance to acids, as stated above.

The combinations, described in German Laid-Open applications Nos. DOS 3,010,719 and DOS 3,027,776, of polyester polyols, hydroxyl-containing acrylic resins or ε-caprolactone-modified hydroxyl-containing poly(meth)acrylates on the one hand and predominantly cycloaliphatic polyisocyanates on the other hand are, as stated above, not very useful as topcoats for automotive repair, particularly because of the relatively high baking temperatures required and the slow surface drying.

The binders described in German Laid-Open application No. DOS 3,137,133, which consist of special hydroxylcontaining polyacrylates and isocyanurate-containing polyisocyanates possessing predominantly cycloaliphatically bonded isocyanate groups, are very useful as such for the automotive repair sector. However, somewhat faster curing of the surface coating films at room temperature as well as improved resistance to premium grade gasoline are desirable.

It is an object of the present invention to provide a novel process for the production of coatings, in which binders based on polyisocyanates which contain isocyanurate groups and may or may not contain biuret groups, have a functionality of from 2.5 to 6, preferably from 3 to 5, and possess predominantly cycloaliphatically bonded isocyanate groups, and hydroxyl-containing polyacrylate resins, are employed in organic solution, these binders being free of the stated technical disadvantages. Thus, using the novel process, starting from surface coating mixtures which have a sufficiently long pot life and carrying out the procedure at low temperatures and without the addition of a catalyst result in non-yellowing films which harden very rapidly to give coatings which are resistant to premium grade gasoline and possess high flexibility, scratch-resistance and weather-resistance or resistance to chalking.

For the purposes of the present invention, functionality is defined as the average number of reactive isocyanate groups, blocked or unblocked, per polyisocyanate molecule.

We have found, surprisingly, that this object is achieved by coatings based on a reaction product of unblocked or partially or completely blocked, preferably unblocked, polyisocyanates which contain isocyanurate groups and may or may not contain biuret groups, have a functionality of from 2.5 to 6, preferably from 3 to 5, and possess predominantly cycloaliphatically bonded isocyanate groups, with hydroxyl-containing polyacrylates of specific composition.

The present invention relates to a process for the production of coatings based on a reaction product of (A) a polyhydroxypolyacrylate resin obtained from esters of acrylic acid and/or methacrylic acid with monofunctional aliphatic alcohols, monoesters of acrylic acid and/or methacrylic acid with polyfunctional aliphatic alcohols and other copolymerizable olefinically unsaturated monomers with (B) a polyisocyanate which is unblocked or partially or completely blocked with CH—, NH— or OH—acidic blocking agents, contains isocyanurate groups and may or may not contain biuret groups and has a functionality of from 2.5 to 6, wherein the polyhydroxypolyacrylate resin (A) used comprises hydroxyl-containing copolymers consisting of (a) from 6 to 70 % by weight of one or more esters of the general formula

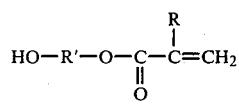

where R is hydrogen or methyl and R' is a straight-chain or branched alkylene radical of 2 to 18 carbon atoms or alkylene of 7 to 17 carbon atoms which contains one, two or three cycloaliphatic groups, and some or all of the HO—R'—groups can be replaced by Z—O—R'—groups, where Z is a radical of the general formula

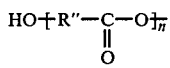

where n is an integer from 1 to 3 and R'' is an alkylene chain of 4 to 8 carbon atoms which may additionally contain 1 to 3 alkyl substituents with a total of not more than 10 carbon atoms and/or a cycloaliphatic radical of 6 to 10 carbon atoms and/or an unsubstituted or alkyl-substituted aromatic radical of 6 to 8 carbon atoms and/or an araliphatic radical of 7 to 9 carbon atoms and/or an alkoxy radical of 1 to 8 carbon atoms, (b) from 0 to 50 % by weight of one or more hydroxyalkyl esters of acrylic acid and/or methacrylic acid of the general formula

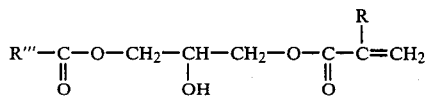

where R is hydrogen or methyl and R''' is the alkyl radical of a branched aliphatic carboxylic acid of 4 to 26 carbon atoms, (c) from 10 to 50 % by weight of one or more alkyl esters of acrylic acid and/or methacrylic acid, which form homopolymers having a glass transition temperature of from +5° to +120° C., (d) from 0 to 10 % by weight of a vinylaromatic, (e) from 10 to 60 % by weight of one or more alkyl esters and/or alkylglycol esters of acrylic acid and/or methacrylic acid, which form homopolymers which have a glass transition temperature of from −80° to +4.5° C., the alkylglycol esters containing not more than 2 ether oxygen bridges, (f) from 0 to 10 % by weight of an acrylamide and/or a methacrylamide which may or may not be substituted at the amide nitrogen by one or two alkyl radicals of 1 to 8 carbon atoms which may or may not contain a carbonyl group, or by one or two phenyl radicals, (g) from 1 to 25 % by weight of one or more polymerizable olefinically unsaturated heterocyclic compounds of the general formulae (I) to (VIII)

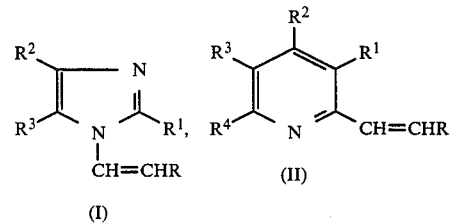

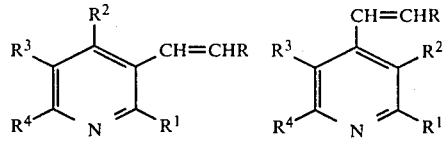

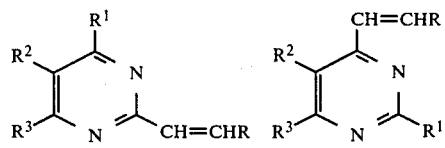

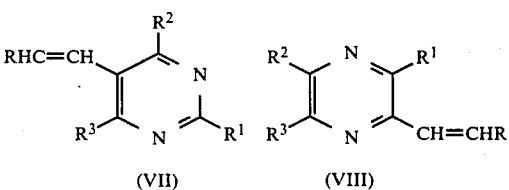

where R is hydrogen or methyl, $R^1$, $R^2$, $R^3$ and $R^4$ are identical or different and are each hydrogen, methyl, ethyl, a straight-chain or branched alkyl radical of 3 or 4 carbon atoms, or phenyl which is unsubstituted or substituted by alkyl of 1 to 4 carbon atoms, halogen or nitro, or are each a group of the general formula —$R^I$—A—$R^{II}$, where A is oxygen or sulfur, $R^I$ is methylene or ethylene or is phenylene which is unsubstituted or substituted by alkyl of 1 to 4 carbon atoms or by halogen or nitro and $R^{II}$ is methyl or ethyl or is phenyl which is unsubstituted or substituted by alkyl of 1 to 4 carbon atoms or by halogen or nitro, or are each halogen or nitro, or a group of the general formulae —O—$R^{III}$, —COO$R^{III}$, —SO$_2 R^{III}$, —CONR$^{III}R^{IV}$ or —SO$_2$NR$^{III}R^{IV}$, where $R^{III}$ and $R^{IV}$ are identical or different and are each methyl, ethyl, a straight-chain or branched alkyl radical of 3 or 4 carbon atoms, or phenyl which is unsubstituted or substituted by alkyl of 1 to 4 carbon atoms or by halogen or nitro, and furthermore in the formulae (I), (II), (III), (V), (VI) and (VIII) $R^2$ and $R^3$, or in the formula (III) $R^3$ and $R^4$, or in the formulae (II) and (IV) $R^3$ and $R^4$ or $R^1$ and $R^2$, or in the formulae (II) and (IV) $R^3$ and $R^4$ and $R^1$ and $R^2$, together with the heterocyclic ring, can form a fused aromatic six-membered ring which is unsubstituted or substituted by alkyl of 1 to 4 carbon atoms or by halogen or nitro, and (h) from 0 to 20 % by weight of monomers which are not stated under (a) to (g) and whose copolymerized radicals are inert to isocyanate groups, with the proviso that the sum of the percentages stated under (a) and (b) is from 6 to 70, the sum of the percentages stated under (c), (d) and (g) is from 11 to 60, and the sum of the percentages of the components stated under (a) to (h) is 100, and the polyisocyanate (B) used, which contains isocyanurate groups, may or may not contain biuret groups and has a functionality of from 2.5 to 6, comprises a mixture of (B1) from 60 to 99 % by weight of an isocyanurate-containing polyisocyanate which possesses predominantly cycloaliphatically bonded isocyanate groups and (B2) from 1 to 40% by weight of a polyisocyanate which contains biuret and/or isocyanurate groups and possesses predominantly aliphatically bonded isocyanate groups, the sum of the percentages stated under (B1) and (B2) being 100, and/or an isocyanurate-containing polyisocyanate which contains, as copolymerized units, (1) from 60 to 99% by weight of a diisocyanate possessing one or more cycloaliphatically bonded isocyanate groups and (2) from 1 to 40% by weight of an aliphatic diisocyanate, the sum of the percentages stated under (1) and (2) being 100.

The present invention furthermore relates to metal components which are provided with a coating by means of the novel process.

Regarding the reaction products used for the novel process, and their components, the following may be stated specifically:

(A) suitable polyhydroxypolyacrylate resins (A) are hydroxyl-containing copolymers comprising (a) from 6 to 70 % by weight of one or more esters of the general formula

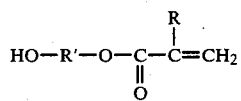

where R is hydrogen or methyl and R' is a straight-chain or branched alkylene radical of 2 to 18 carbon atoms or alkylene of 7 to 17 carbon atoms which contains one, two or three cycloaliphatic groups, and some or all of the HO—R'—groups can be replaced by Z—O—R'—groups, where Z is a radical of the general formula

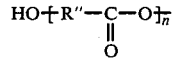

where n is an integer from 1 to 3 and R" is an alkylene chain of 4 to 8 carbon atoms which may additionally contain 1 to 3 alkyl substituents with a total of not more than 10 carbon atoms and/or a cycloaliphatic radical of 6 to 10 carbon atoms and/or an unsubstituted or alkyl-substituted aromatic radical of 6 to 8 carbon atoms and/or an araliphatic radical of 7 to 9 carbon atoms and/or an alkoxy radical of 1 to 8 carbon atoms, (b) from 0 to 50 % by weight of one or more hydroxyalkyl esters of acrylic acid and/or methacrylic acid of the general formula

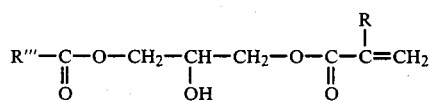

where R is hydrogen or methyl and R''' is the alkyl radical of a branched aliphatic carboxylic acid of 4 to 26 carbon atoms, (c) from 10 to 50 % by weight of one or more alkyl esters of acrylic acid and/or methacrylic acid, which form homopolymers having a glass transition temperature of from +5° to +120° C., (d) from 0 to 10 % by weight of a vinylaromatic, (e) from 10 to 60 % by weight of one or more alkyl esters and/or alkylglycol esters of acrylic acid and/or methacrylic acid, which form homopolymers which have a glass transition temperature of from −80° to +4.5° C., the alkylglycol esters containing not more than 2 ether oxygen bridges, (f) from 0 to 10 % by weight of an acrylamide and/or a methacrylamide which may or may not be substituted at the amide nitrogen by one or two alkyl radicals of 1 to 8 carbon atoms which may or may not contain a carbonyl group, or by one or two phenyl radicals, (g) from 1 to 25 % by weight of one or more polymerizable olefinically unsaturated heterocyclic compounds of the general formulae (I) to (VIII)

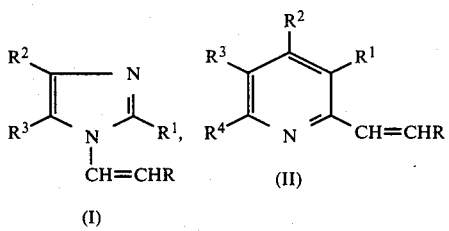

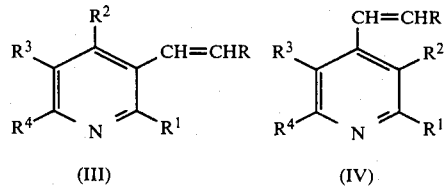

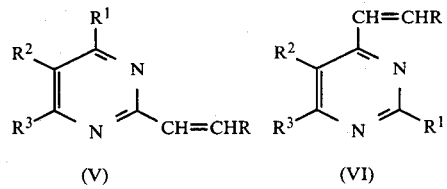

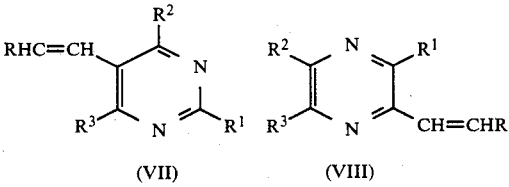

where R is hydrogen or methyl, $R^1$, $R^2$, $R^3$ and $R^4$ are identical or different and are each hydrogen, methyl, ethyl, a straight-chain or branched alkyl radical of 3 or 4 carbon atoms, or phenyl which is unsubstituted or substituted by alkyl of 1 to 4 carbon atoms, halogen or nitro, or are each a group of the general formula $—R^I—A—R^{II}$, where A is oxygen or sulfur, $R^I$ is methylene or ethylene or is phenylene which is unsubstituted or substituted by alkyl of 1 to 4 carbon atoms or by halogen or nitro and $R^{II}$ is methyl or ethyl or is phenyl which is unsubstituted or substituted by alkyl of 1 to 4 carbon atoms or by halogen or nitro, or are each halogen or nitro, or a group of the general formulae $—OR^{III}$, $—COOR^{III}$, $—SO_2R^{III}$, $—CONR^{III}R^{IV}$ or $—SO_2NR^{III}R^{IV}$, where $R^{III}$ and $R^{IV}$ are identical or different and are each methyl, ethyl, a straight-chain or branched alkyl radical of 3 or 4 carbon atoms, or phenyl which is unsubstituted or substituted by alkyl of 1 to 4 carbon atoms or by halogen or nitro, and furthermore in the formulae (I), (II), (III), (V), (VI) and (VIII) $R^2$ and $R^3$, or in the formula (III) $R^3$ and $R^4$, or in the formulae (II) and (IV) $R^3$ and $R^4$ or $R^1$ and $R^2$, or in the formulae (II) and (IV) $R^3$ and $R^4$ and $R^1$ and $R^2$, together with the heterocyclic ring, can form a fused aromatic six-membered ring which is unsubstituted or substituted by alkyl of 1 to 4 carbon atoms or by halogen or nitro, (h) from 0 to 20 % by weight of monomers which are not stated under (a) to (g) and whose copolymerized radicals are inert to isocyanate groups, with the proviso that the sum of the percentages stated under (a) and (b) is from 6 to 70, the sum of the percentages stated under (c), (d) and (g) is from 10 to 60, and the sum of the percentages of the components stated under (a) to (h) is 100.

(a) Examples of suitable esters of the general formula

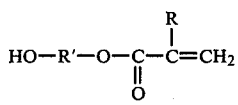

where R is hydrogen or methyl and R' is a straight-chain or branched alkylene radical of 2 to 18 carbon atoms or an alkylene radical of 7 to 17 carbon atoms which contains one, two or three cycloaliphatic groups, and some or all of the HO—R'—groups can be replaced by Z—O—R'—groups, where Z is a radical of the general formula

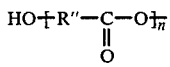

where n is an integer from 1 to 3 and R'' is an alkylene chain of 4 to 8 carbon atoms which may additionally contain 1 to 3 alkyl substituents with a total of not more than 10 carbon atoms and/or a cycloaliphatic radical of 6 to 10 carbon atoms and/or an unsubstituted or alkyl-substituted aromatic radical of 6 to 8 carbon atoms and/or an araliphatic radical of 7 to 9 carbon atoms and/or an alkoxy radical of 1 to 8 carbon atoms, are monoesters of dihydric alcohols, such as decane-1.10-diol, octane-1,8-diol, pentane-1,5-diol, 1,4-dihydroxymethylcyclohexane, 3(4),8(9)-dihydroxymethyltricyclo[5.2.1.0$_{2.6}$]decane, 2,2-dimethylpropane -1,3-diol, butane-1,4-diol, hexane-1,6-diol, propane-1,2-diol or ethane-1,2-diol, with acrylic acid or methacrylic acid, eg. decane-1,10-diol monoacrylate, decane-1,.10-diol monomethacrylate, octane-1,8-diol monoacrylate, octane-1,8-diol monomethacrylate, pentane-1,5-diol monoacrylate, pentane-1,5-diol monomethacrylate, 1,4-dihydroxymethylcyclohexane monoacrylate, 1,4-dihydroxymethylcyclohexane monomethacrylate, 3(4),8(9)-dihydroxymethyltricyclo[5.2.1.0$^{2.6}$]decane monoacrylate and monomethacrylate, 2,2-dimethylpropane-1,3-diol monoacrylate and monomethacrylate, butane-1,4-diol monomethacrylate, hexane1,6-diol monomethacrylate, 2-hydroxypropyl acrylate, 2-hydroxypropyl methacrylate and preferably hydroxyethyl acrylate, hydroxyethyl methacrylate or butane-1,4-diol monoacrylate and monomethacrylate and hexane-1,6-diol monoacrylate and monomethacrylate.

Furthermore, products can be used which are obtained by reacting the above hydroxyl-containing acrylates or methacrylates with unsubstituted or substituted lactones having 4 to 8 carbon atoms in the ring, the molar ratio of the reactants being from 1.5:1 to 1:3. Examples of lactones which can be used for this purpose are: δ-valerolactone, γ, γ-dimethylvalerolactone, ε-caprolactone, α-, β-, γ-, δ- and ε-methyl-ε-caprolactone, the corresponding monoethyl-, monopropyl-, monoisopropyl- and monooctyl-ε-caprolactones, β, δ-dimethyl-, γ, γ-dimethyl-, β, δ, δ-trimethyl-, β-methyl- δ-ethyl-, γ-cyclohexyl- and γ-phenyl- ε-caprolactone, ρ-enantholactone and δ-caprylolactone, δ-caprolactone being particularly preferred.

Preferred lactone adducts are the reaction products of hydroxyethyl acrylate and/or methacrylate and/or -hydroxypropyl acrylate and/or methacrylate and/or butane-1,4-diol monoacrylate and/or hexane-1,6-diol monoacrylate and/or butane-1,4-diol monomethacrylate and/or hexane-1,6-diol monomethacrylate with ε-caprolactone in a molar ratio of from 1.5:1 to 1:3, the adducts based on hydroxyethyl acrylate and/or methacrylate, 2-hydroxypropyl acrylate and/or methacrylate and butane-1,4-diol monoacrylate and/or monomethacrylate being particularly preferred. It is of course also possible to use, as the hydroxyl-containing acrylates and/or methacrylates, mixtures of the stated lactone adducts with the above hydroxyalkyl acrylates and/or methacrylates in any desired ratio from 1:99 to 99:1. The unsaturated lactone adducts are prepared by a conventional method, as described in German Laid-Open application DOS No. 3,027,776, for example by reacting hydroxyl-containing acrylates and/or methacrylates with ε-caprolactone, the ratio of the number of equivalents being from 1.5:1 to 1:3; the reaction is carried out at from 60 to 130° C. in the presence of from 0.01 to 0.15% by weight of an organotin catalyst, eg. dibutyl-tin oxide or dibutyl-tin diacetate, while passing air through the mixture.

The copolymer (A) used according to the invention contains from 6 to 70, preferably from 6 to 50, % by weight of component (a) as copolymerized units.

(b) Examples of suitable hydroxyalkyl esters of acrylic acid and/or methacrylic acid of the general formula

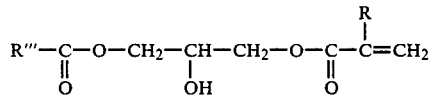

where R is hydrogen or methyl and R''' is the alkyl radical of a branched carboxylic acid of 4 to 26 carbon atoms, are trimethylacetoxyglycidyl (meth)acrylate and versatic acid glycidyl ester acrylate and methacrylate. Mixtures of the stated hydroxyalkyl methacrylates and acrylates are also suitable.

The polyhydroxypolyacrylate resin (A) can contain from 0 to 50, preferably from 0 to 25, % by weight of component (b) as copolymerized units. The sum of the percentages stated under (a) and (b) is from 6 to 70, preferably from 6 to 50, % by weight.

(c) Examples of suitable alkyl esters of acrylic acid and/or methacrylic acid which form homopolymers having a glass transition temperature of from +5 to +120° C. are methyl acrylate, methyl methacrylate, ethyl methacrylate, tert.-butyl acrylate, n-butyl methacrylate and i-butyl methacrylate as well as mixtures of these, methyl methacrylate and tert.-butyl acrylate being preferred.

The copolymer (A) used according to the invention contains from 10 to 50, preferably from 25 to 50, % by weight of component (c) as copolymerized units. (d) Examples of suitable vinylaromatics are styrene, α-methylstyrene, o— and p-chlorostyrene, o—, m— and p—, methylstyrene and p-tert.-butylstyrene as well as mixtures of these, styrene being preferred.

The polyhydroxypolyacrylate resin (A) can contain from 0 to 10, preferably from 0 to 7, % by weight of the vinylaromatics (d) as copolymerized units.

The sum of the percentages stated under (c) and (d) is in general from 10 to 50, preferably from 25 to 50, by weight.

(e) Examples of suitable alkyl esters and/or alkylglycol esters of acrylic acid and/or methacrylic acid, where the esters form homopolymers having a glass transition temperature of from $-80°$ to $+4.5°$ C. and their alkylglycol esters contain not more than 2 ether oxygen bridges, are ethyl acrylate, n-butyl acrylate, i-butyl acrylate, 2-ethylhexyl acrylate, 2-ethylhexyl methacrylate, ethylglycol acrylate, ethylglycol methacrylate, ethyldiglycol acrylate, ethyldiglycol methacrylate, lauryl acrylate and lauryl methacrylate as well as mixtures of these, n-butyl acrylate and i-butyl acrylate being preferred.

The copolymer (A) used according to the invention contains from 10 to 60, preferably from 20 to 50, % by weight of component (e) as copolymerized units.

(f) Examples of suitable acrylamides and/or methacrylamides which may or may not be substituted at the amide nitrogen by one or two alkyl radicals of 1 to 8 carbon atoms which may or may not contain a carbonyl group, or by one or two phenyl radicals are acrylamide, methacrylamide, N-methylacrylamide, N-methylmethacrylamide, N-ethylacrylamide, N-isopropylacrylamide, N,N-dimethylacrylamide, N,N-diethylacrylamide, N,N-diisopropylacrylamide, N-phenylacrylamide, N,N-di-n-butylacrylamide and N-(1,1-dimethyl-3-oxobutyl)-acrylamide (diacetoneacrylamide), acrylamide and methacrylamide being preferred.

The polyhydroxypolyacrylate resin (A) can contain from 0 to 10, preferably from 0 to 5, % by weight of component (f) as copolymerized units.

(g) Examples of suitable polymerizable olefinically unsaturated heterocyclic compounds of the above general formulae (I) to (VIII), where R is hydrogen or methyl, $R^1$, $R^2$, $R^3$ and $R^4$ are identical or different and are each hydrogen, methyl, ethyl, a straight-chain or branched alkyl radical of 3 or 4 carbon atoms, or phenyl which is unsubstituted or substituted by alkyl of 1 to 4 carbon atoms, halogen, eg. chlorine or bromine, nitro, or are each a group of the general formula $-R^I-A-R^{II}$, where A is oxygen or sulfur, $R^I$ is methylene or ethylene or is phenylene which is unsubstituted or substituted by alkyl of 1 to 4 carbon atoms or by halogen or nitro and $R^{II}$ is methyl or ethyl or is phenyl which is unsubstituted or substituted by alkyl of 1 to 4 carbon atoms or by halogen or nitro, or are each halogen or nitro, or a group of the general formulae $-OR^{III}$, $-COOR^{III}$, $-SO_2R^{III}$, $-CONR^{III}R^{IV}$ or $-SO_2NR^{III}R^{IV}$, where $R^{III}$ and $R^{IV}$ are identical or different and are each methyl, ethyl, a straight-chain or branched alkyl radical of 3 or 4 carbon atoms, or phenyl which is unsubstituted or substituted by alkyl of 1 to 4 carbon atoms or by halogen or nitro, and furthermore in the formulae (I), (II), (III), (V), (VI) and (VIII) R2 and R3, or in the formula (III) $R^3$ and $R^4$, or in the formulae (II) and (IV) $R^3$ and $R^4$ or $R^1$ and $R^2$, or in the formulae (II) and (IV) $R^3$ and $R^4$ and $R^1$ and $R^2$, together with the heterocyclic ring, can form a fused aromatic six-membered ring which is unsubstituted or substituted by alkyl of 1 to 4 carbon atoms or by halogen, eg. chlorine or bromine, or nitro, are N-vinylimidazoles, such as 1-vinyl-2-methylimidazole, 1-vinyl-2-phenylimidazole, 1-vinylbenzimidazole, 1-vinyl-2-ethylimidazole, 1-propenyl-2-methylimidazole, 1-vinyl-4-methylimidazole, 1-vinyl-2-ethyl-4-methylimidazole, 1-vinyl-4-nitroimidazole, 1-vinylimidazole and 1-propenylimidazole as well as mixtures of these, 1-vinylimidazole, 1-vinyl-2-methylimidazole and 1-vinyl-2-phenylimidazole being preferred. Other suitable olefinically unsaturated heterocyclic compounds (g) are vinylheterocyclic compounds of the formulae (II) to (VIII), eg. 2-vinylpyridine, 3-vinylpyridine, 4-vinylpyridine, 5-ethyl-2-vinylpyridine, 6-methyl-3-vinylpyridine, 2-vinylquinoline, 2-vinylisoquinoline, 4-vinylquinoline, 2-vinylquinoxaline, 4-vinylquinazoline, 2-vinylpyrimidine, 4-vinylpyrimidine and 2-vinylpyridazine as well as mixtures of these, 3-vinylpyridine and 4-vinylpyridine being preferred.

The copolymer (A) used according to the invention contains from 1 to 25, preferably from 2 to 20, % by weight of component (g) as copolymerized units.

(h) Examples of suitable monomers not mentioned under (a) to (g), whose copolymerized radicals are inert to isocyanate groups, ie. do not react with isocyanate or blocked isocyanate groups under the reaction conditions employed in the novel process, are vinylesters of carboxylic acids of 1 to 12 carbon atoms, eg. vinyl acetate, vinyl propionate, vinyl pivalate, vinyl 2-ethylhexanoate, vinyl laurate or vinyl benzoate, vinyl halides, eg. vinyl chloride, vinylidene halides, eg. vinylidene chloride, and N-vinylpyrrolidone and N-vinylcaprolactam, as well as mixtures of the stated monomers.

The polyhydroxypolyacrylate resin can contain from 0 to 20, preferably from 0 to 10, % by weight of component (h) as copolymerized units.

The sum of the percentages stated under (a) to (h) is 100.

The hydroxyl-containing copolymer (A) has a hydroxyl number of in general from 30 to 250, preferably from 50 to 150.

The polyhydroxypolyacrylate resin (A) can be prepared from the monomers (a) to (h) by a conventional polymerization process, for example by continuous or batchwise free radical polymerization, preferably by a batchwise procedure in organic solution at from $80°$ to $160°$, for example in the presence of a free radical initiator. The polyhydroxypolyacrylate resins (A) generally have number average mean molecular weights ($M_n$) of from 1,000 to 20,000, preferably from 2,000 to 10,000, or K values (according to Fikentscher) of from 12 to 40, preferably from 15 to 30, and, for the novel process, are advantageously employed in solution in an organic solvent which is inert to isocyanate groups. Examples of suitable solvents of this type are esters, such as n-butyl, acetate, ethyl acetate or isopropyl acetate, ethers, such as tetrahydrofuran, dioxane or diethylglycol, ethylesters, such as ethyl glycol acetate, methyl glycol acetate and butyl glycol acetate, hydrocarbons, in particular aromatic hydrocarbons, such as xylene, toluene or ethylbenzene, and halohydrocarbons, such as chlorobenzene, as well as mixtures of these.

(B) Suitable isocyanurate-containing polyisocyanates which may or may not contain biuret groups, are unblocked or partially or completely blocked with CH—, NH—or OH—acidic blocking agents, have a functionality of from 2.5 to 6, preferably from 3 to 5, and are used according to the invention are those which posses predominantly cycloaliphatically bonded isocyanate groups. Examples of suitable polyisocyanates for this purposed are polyisocyanate mixtures (B) whose principal component (B1) is preferably an isocyanurate-containing trimer of 3-isophorone diisocyanate, IPDI). The preparation of such isocyanurate-containing polyisocyanates can be carried out, for example, by a conventional method, as described in, for example, British Pat. No. 1,391,066 or German Laid-Open application Nos. DOS 2,325,826 or DOS 2,732,662, for example by trimerization of the diisocyanate at from about 40° to 120° C. in the presence of a catalyst, for example a metal compound, e.g. a metal naphthenate, an alkaline earth metal acetate, formate or carbonate, a metal alkoxide or iron acetylacetonate, preferably secondary and tertiary amines, such as aziridines in combination with trialkylamines or triethylenediamine, combined with propylene oxide.

Isocyanurate-containing polyisocyanates based on 1,4-diisocyanatocyclohexane (cyclohexane 1,4-diisocyanate) and 4,4'-diisocyanatodicyclohexylmethane (dicyclohexylmethane 4,4'-diisocyanate) are also suitable.

Examples of isocyanate components (B2) used for the novel process are isocyanate adducts which contain biuret groups and predominantly aliphatically bonded isocyanate groups.

A particularly preferred compound of this type is biuretized hexamethylene diisocyanate, which has long been known and, as stated above, is used specifically in two-component polyurethane surface coatings for the automotive repair sector. It is prepared, as described in, for example, German Patent Nos. 1,101,394, 1,104,394, 1,174,759, 1,174,760, 1,227,004 and 1,227,007, British Patent No. 1,044,932 and German Laid-Open application No. DOS 1,931,055, for example by the action of free or bonded water (for example in the form of water of crystallization or in the form of formic acid), primary aliphatic monoamines or tertiary aliphatic monoalcohols on hexamethylene diisocyanate at from 80° to 200° C., followed by the removal of the excess diisocyanate by distillation under reduced pressure in a thin-film evaporator. Other isocyanate components (B2) which can be used according to the invention are isocyanurate-containing polyisocyanates trimerization of some of the isocyanate groups of organic diisocyanates, as described in, for example, German Patent No. 1,201,992, and German Laid-Open application Nos. DOS 1,644,809, DOS 1,670,667, DOS 2,325,826, DOS 2,616,415, DOS 2,616,416, DOS 2,644,684, DOS 2,724,914 and DOS 2,806,731.

The isocyanate mixture (B) consists of from 60 to 99, preferably from 70 to 99, % by weight of polyisocyanates (B1) which possess isocyanurate groups and predominantly cycloaliphatically bonded isocyanate groups, and from 1 to 40, preferably from 1 to 30, % by weight of the last-mentioned polyisocyanates (B2) which contain biuret and/or isocyanurate groups and possess predominantly aliphatically bonded isocyanate groups, the sum of the percentages stated under (B1) and (B2) being 100.

Instead of the above mixtures of the polyisocyanate components (B1) and (B2), the novel process can also be carried out using isocyanurate-containing polyisocyanates (B) which possess predominantly cycloaliphatically bonded isocyanate groups and contain both cycloaliphatic and aliphatic diisocyanates as copolymerized units. Examples of suitable cycloaliphatic diisocyanates are 1,4-diisocyanatocyclohexane and 4,4'-diisocyanatodicyclohexylmethane, but preferably isophorone diisocyanate, while the preferred aliphatic diisocyanate is hexamethylene diisocyanate. These mixed cycloaliphatic/aliphatic polyisocyanates can be prepared, as described in German Laid-Open application No. DOS 3,033,860, by trimerization of the diisocyanate mixture at from 40° to 100° C., preferably using a suitable hydroxyl-substituted quaternary ammonium hydroxide. Mixed isocyanurate-containing adducts which are suitable for the novel process contain, as copolymerized units, for example (1) from 60 to 99 preferably from 70 to 98, % by weight of a cycloaliphatic diisocyanate, preferably isophorone diisocyanate, and 2) from 1 to 40, preferably from 2 to 30,% by weight of an aliphatic diisocyanate, preferably hexamethylene diisocyanate, the sum of the percentages stated under (1) and (2) being 100.

Of course, the novel process can be carried out using any of the above polyisocyanate adducts in any possible combination.

The use, according to the invention, of such polyisocyanate mixtures which comprise minor amounts of adducts which contain biuret groups and aliphatically bonded isocyanate groups (for example compounds based on hexamethylene diisocyanate) or trimers obtained from cycloaliphatic diisocyanates and minor amounts of aliphatic diisocyanates (for example isophorone diisocyanate and hexamethylene diisocyanate) has the following advantages over the prior art: on the one hand, the use of even relatively small amounts of aliphatic isocyanate adducts results in surface coating films which possess excellent flexibility and undergo crosslinking rapidly; on the other hand, surprisingly, the advantages implicit in the use of cycloaliphatic trimers, for example very hard coatings, a relatively advantageous pot life and in particular low toxicity of the inhaled surface coating mixtures, are substantially retained.

Suitable blocking agents for the surface coating polyisocyanates (B) are: CH—, NH—or OH—acidic blocking agents, e.g. dialkyl malonates, dialkyl acetoacetates, acetylacetone, ε-caprolactam, pyrrolidone, phenols, p-hydroxybenzoates, cyclohexanol, t-butanol and preferably oximes, such as benzophenone oxime, cyclohexanone oxime, methyl ethyl ketoxime or dimethyl ketoxime. Monofunctional ketoximes, in particular methyl ethyl ketoxime and dimethyl ketoxime, are particularly preferred.

Component (B) can be unblocked or partially or completely blocked, but unblocked polyisocyanates are preferred. ferred.

The ratio of the two binder components used according to the invention, i.e. of the polyisocyanate (B) to the polyhydroxypolyacrylate (A) is advantageously chosen so that the ratio of the number of equivalents of isocyanate groups (blocked or unblocked) to reactive hydroxyl groups is from 0.25 : 1 to 4 : 1, preferably from 0.5 : 1 to 2 : 1.

Coatings are produced by the novel process by mixing components (A) and (B), advantageously dissolved in an organic solvent or solvent mixture, if necessary adding pigments, such as conventional white and black pigments, e.g. titanium dioxides (rutile), zinc sulfides or carbon black, or colored pigments, e.g. cadmium sulfide, iron oxide yellow, iron oxide red, chromium oxide, benzidine yellow, phthalocyanine blue, phthalocyanine green, thioindigo or quinacridones, for example in amounts of not more than 250%, based on the total amount of binder (components (A) and (B)), as well as other assistants and additives conventionally used for processing two-component surface coatings, and then applying the mixture onto the substrate to be coated. In principle, catalysts, such as metal compounds, e.g. lead naphthenate, zinc naphthenate, cobalt naphthenate, lead octoate, tin octoate, calcium octoates dibutyl-tin diacetate, dibutyl-tin dilaurate or iron acetylacetonate, and bases, such as triethylenediamine or diethylethanolamine, can also be used, in amounts of about 0.001–10% by weight, based on the total amount of binder, but the coatings are preferably produced without the addition of a catalyst since, as stated above, a surprising advantage of the novel surface coating mixtures is that they harden very rapidly in the absence of an accelerator to give hard, scratch-resistant coatings resistant to premium grade gasoline but still have a pot life which meets practical requirements.

Suitable methods of application are the conventional ones, for example spraying, dipping, painting or roller-coating.

The novel process can be used for coating, for example, metal components made of aluminum, zinc, tin, iron or steel, e.g. steel sheet, or galvanized steel sheet or aluminum sheet, as well as other substrates, such as wood, paper, concrete or plastics, e.g. PVC or nylon.

After application onto the substrate, the coatings can be cured in a conventional manner, for example at room temperature in the course of from 24 hours to 7 days; advantageously, drying in the air is carried out at room temperature, followed by curing at about 60°–80° C. in the course of from 20 to 60 minutes.

The process according to the invention can be used to produce coatings which have particularly advantageous properties. The coatings obtained according to the invention are distinguished in particular by high scratch-resistance, excellent resistance to premium grade gasoline after relatively short drying times, high flexibility, high gloss and excellent weather-resistance coupled with rapid curing, and the surface coating mixtures from which the coatings are produced have relatively long pot lives.

In the Examples and Comparative Examples, parts and percentages are by weight, unless stated otherwise.

Preparation of the polyhydroxypolyacrylate resins

The polyhydroxypolyacrylate resins A to G are prepared by a prior art method.

Polyacrylate resin A 100 parts of a 1:1 mixture of n-butyl acetate and xylene are heated at 100° C. in a reaction vessel provided with a paddle stirrer, a reflux condenser, a feed vessel, a thermometer and a gas inlet tube. A solution of 77.5 parts of butane-1,4-diol monoacrylate, 42.5 parts of hydroxyethyl acrylate, 75 parts of methyl methacrylate, 90 parts of t-butyl acrylate, 190 parts of n-butyl acrylate, 25 parts of 1-vinylimidazole and 10 parts of azodiisobutyronitrile in 130 parts of a 1:1 mixture of n-butyl acetate and xylene is added dropwise in the course of 4 hours at a constant rate and in the absence of air (in a gentle stream of nitrogen), while maintaining the temperature of 100° C. and stirring vigorously. Further polymerization is then carried out by uniformly metering 2.5 parts of azodiisobutyronitrile in 75 parts of a 1:1 mixture of n-butyl acetate and xylene in the course of 2 hours.

The resulting polyacrylate resin has the following characteristics:

Hydroxyl number = about 102 (based on solids)
Viscosity at 23° C. = 2750 mPa.s
K value (3% strength in dimethylformamide) = 21.8.

Polyacrylate resins B to D and F to G

The preparation of the copolymers is carried out as described for polyacrylate resin A. The composition and characteristics of the products are shown in Table 1.

TABLE 1

| Polyacrylate resin | B | C | D | F | G |
|---|---|---|---|---|---|
| Butane-1,4-diol monoacrylate (parts) | — | — | — | 38.5 | — |
| Hydroxyethyl acrylate (HEA) (parts) | 103 | 103 | 103 | — | 31 |
| Adduct of HEA and Σ—caprolactone* (parts) | — | — | — | 143.5 | 143.5 |
| Methyl methacrylate (parts) | 100 | 50 | 50 | 75 | 100 |
| Styrene (parts) | — | 40 | 65 | — | — |
| t-Butyl acrylate (parts) | 125 | 150 | 150 | 153 | 153 |
| n-Butyl acrylate (parts) | 147 | 132 | 132 | 65 | 72.5 |
| 1-Vinylimidazole (parts) | 25 | 25 | — | 25 | — |
| Hydroxyl number (mg of KOH/g, based on solids) | about 98 | about 100 | about 98 | about 100 | about 100 |
| Viscosity at 23° C. (mPa.s) | 3,100 | 3,450 | 3,050 | 3,900 | 3,500 |
| K value (3% strength in dimethylformamide) | 22.0 | 23.4 | 22.5 | 22.9 | 22.7 |

*prepared from 50.4% by weight of hydroxyethyl acrylate and 49.6% by weight of Σ—caprolactone; molar ratio 1:1

Polyacrylate resin E

A mixture of 100 parts of ethylglycol acetate, 200 parts of xylene and 149 parts of glycidyl esters of α, β-dialkylalkanemonocarboxylic acids of the empirical formula $C_{13}H_{24}O_3$ is heated at 135° C. in a reaction vessel as described above. A mixture of 101 parts of methyl methacrylate, 94 parts of hydroxyethyl methacrylate, 111 parts of styrene, 44 parts of acrylic acid, 1.5 parts of t-dodecylmercaptan and 5 parts of di-tert.-butyl peroxide is then added dropwise at a constant rate in the course of 2 hours at this temperature, and the resin solution is left to continue reacting for a further 6 hours at 135° C. The polymer solution has a solids content of 60%, which is brought to 50 % with xylene; the solution has an efflux time of 250 sec in DIN cup 4 at 23° C. Further characteristics are as follows:

OH number (based on solids) = 150
Acid number = 7
K value = 23.9
Polyisocyanates used The following polyisocyanate components (B) are employed for the preparation of the novel coatings:
Polyisocyanate I An isocyanurate-containing polyisocyanate which possesses predominantly cycloaliphatically bonded isocyanate groups, is based on isophorone diisocyanate and has an NCO content of about 12%; used as a 70% strength solution in a 1:1 mixture of xylene and ethyleneglycol acetate.

Polyisocyanate II

A polyisocyanate which contains biuret groups and aliphatically bonded isocyanate groups, is based on hexamethylene diisocyanate and has an NCO content of about 16.5%; used as a 75% strength solution in a 1:1 mixture of xylene and ethylglycol acetate.

Polyisocyanate III

An isocyanurate-containing polyisocyanate which contains aliphatically bonded isocyanate groups, is based on hexamethylene diisocyanate and has an NCO content of about 22%; used without a solvent.

1. Testing unpigmented two-component reactive surface coatings

The above polyacrylate resins A to G are combined with the mixtures of polyisocyanates I to III, as shown in Table 2, and the properties of the resulting clear surface coating films are determined.

To do this, 500 parts, in each case, of copolymer solutions, having a solids content of about 62% for Examples 1 to 9 and Comparative Examples 10, 11, 14 and 15 and about 50% for Comparative Examples 11 and 12, are mixed carefully with the stoichiometric amounts, stated in Table 2, of the polyisocyanate components I to III, and the mixture is then diluted to spray viscosity (efflux time 20 sec, DIN cup 4 at 23° C.) with n-butyl acetate. In addition, in the case of Comparative Examples 10, 12 and 14, one formulation is prepared in each case with the addition of a catalyst (30 parts of a 1% strength solution of dibutyl tin dilaurate in n-butyl acetate, corresponding to 0.07%, based on solids, and 46 parts of a 4% strength solution of calcium octoate in n-butyl acetate, corresponding to 0.43%, based on solids). The mixtures are then sprayed onto steel sheets to give a film which is from 40 to 50 μm thick when dry. The surface coating films are either cured for 1 day and 7 days at room temperature or are first dried in the air for 30 minutes at room temperature and then cured in a through-circulation drier for 30 minutes and 60 minutes, at 80° C. in each case. The König pendulum hardness, the scratch-resistance and the Erichsen deep-drawing value are determined for the coatings cured for 7 days at room temperature and for 60 minutes at 80° C., the König pendulum hardness is determined for the coating cured for 1 day at room temperature, and the pendulum hardness and the Erichsen deep-drawing value are determined for the coating cured for 30 minutes at 80° C. The test results are summarized in Table 2.

As Table 2 shows, the clear surface coating films prepared according to the invention and without the use of a catalyst simultaneously exhibit rapid curing, great final hardness, scratch-resistance and flexibility both when dried at room temperature and when drying is forced. The films (cf. Comparative Examples 10 to 15) correspondingly obtained from prior art polyacrylate resins and a mixture of isocyanurate-containing polyisocyanate based on isophorone diisocyanate (polyisocyanate I) with a biuret-containing polyisocyanate based on hexamethylene diisocyanate (polyisocyanate II) exhibit a much less advantageous spectrum of properties than the novel coatings, even when large amounts of catalyst are used. For example, either the films are very flexible but harden relatively slowly and possess only moderate final hardness and scratch-resistance, or they possess improved hardness and scratch-resistance but in some cases are not sufficiently flexible.

TABLE 2

| Example No.* | Clear surface coating mixtures | | | | Properties of the white surface coating films | | | | | | | | | |
|---|---|---|---|---|---|---|---|---|---|---|---|---|---|---|
| | Acrylic resin solution | Polyisocyanate (parts) | | | Curing at room temperature | | | | Curing at 80° C. | | | | | |
| | | | | | 1 day | 7 days | | | 30 min | | | 60 min | | |
| | | I | II | III | PH (sec) | PH (sec) | SR | ED (mm) | PH (sec) | SR | ED (mm) | PH (sec) | SR | ED (mm) |
| 1 | A | 173 | 18 | | 134 | 170 | 1 | 8.4 | 197 | 0-1 | 8.2 | 197 | 0 | 7.5 |
| 2 | A | 150 | 35 | | 133 | 168 | 0 | 8.1 | 196 | 0 | 8.0 | 196 | 0 | 7.7 |
| 3 | A | 127 | 51 | | 147 | 165 | 1 | 8.5 | 190 | 1 | 8.3 | 192 | 0-1 | 8.2 |
| 4 | A | 150 | | 26 | 137 | 173 | 0-1 | 8.6 | 195 | 0-1 | 8.3 | 198 | 0 | 7.8 |
| 5 | B | 144 | 34 | | 125 | 176 | 0 | 9.1 | 199 | 0 | 9.0 | 199 | 0 | 8.9 |
| 6 | B | 144 | | 25 | 130 | 178 | 0-1 | 9.0 | 202 | 1 | 9.1 | 199 | 0 | 8.6 |
| 7 | C | 147 | 34 | | 127 | 178 | 0-1 | 9.2 | 200 | 0-1 | 9.1 | 203 | 0 | 9.2 |
| 8 | C | 147 | | 25 | 133 | 181 | 1 | 9.1 | 203 | 1 | 9.2 | 202 | 0-1 | 8.7 |
| 9 | F | 147 | 34 | | 120 | 175 | 0 | 10.2 | 198 | 0 | 10.5 | 205 | 0 | 9.0 |
| 10 | D | 144 | 34 | | 31 | 112 | 3 | 9.8 | 115 | 3 | 10.0 | 136 | 2-3 | 6.3 |
| 11 | as for 10; but with the: addition of a catalyst** | | | | 103 | 152 | 2 | 4.5 | 145 | 2-3 | 5.0 | 170 | 1 | 2.3 |
| 12 | E | 178 | 42 | | 95 | 185 | 1 | 1 | 203 | 1 | 1 | 200 | 1 | 2.3 |
| 13 | as for 12; but with the: addition of a catalyst** | | | | 130 | 195 | 0 | 1 | 197 | 0 | 1.3 | 205 | 0 | 5.0 |
| 14 | G | 147 | 34 | | 93 | 160 | 2-3 | 3.4 | 155 | 2-3 | 4.0 | 178 | 1-2 | 6.5 |
| 15 | as for 14; but with the: addition of a catalyst** | | | | 112 | 165 | 1-2 | 5.8 | 172 | 1-2 | 6.8 | 180 | 0 | 6.0 |

*Examples 10 to 15 are Comparative Examples
**Catalyzed with 30 parts of a 1% strength solution of dibutyl-tin dilaurate in n-butyl acetate/46 parts of a 4% strength solution of calcium octoate in n-butyl acetate
Abbreviations:
PH: König pendulum hardness (sec) according to DIN 53,157
SR: Scratch-resistance, rating 0-5, according to DIN 53,230
ED: Erichsen deep-drawing value (mm), according to DIN 53,156

2. Testing the pigmented two-component reactive surface coatings (corresponding to Examples 1 to 9 and Comparative Examples 10 to 15)

500 parts of the copolymer solutions, having a solids content of about 62% in the case of Examples 1 to 9 and Comparative Examples 10, 11, 14 and 15, and of about 50% in the case of Comparative Examples 12 and 13, are milled with 440 parts of titanium dioxide (rutile) and 150 parts of a 4:4:2 solvent mixture of n-butyl acetate, xylene and ethyl glycol acetate to give a surface coating mixture. In each case, the stoichiometric amount, stated in Table 2, of polyisocyanate mixture is added to the pigmented surface coating mixture, and the surface coating mixture obtained is diluted to spray viscosity (efflux time 20 sec, DIN cup 4 at 23° C.) with the solvent mixture stated above. In addition, in the case of Comparative Examples 11, 13 and 15, a formulation is prepared in each case with the addition of a catalyst mixture comprising 30 parts of a 1% strength solution of dibutyl-tin dilaurate (corresponding to 0.07% solids, based on the binder) and 46 parts of a 4% strength solution of calcium octoate in n-butyl acetate (corresponding to 0.43% solids, based on binder). The surface coatings are then sprayed onto steel sheets to give a film which is about 50 μm thick when dry. The coated sheets are dried in the air for 30 minutes at room temperature and then dried in a through-circulation drier for 60 minutes at 80° C.; furthermore drying is carried out of 7 days at room temperature. In each case, the König pendulum hardness according to DIN 53,157, the scratch-resistance according to DIN 53,230, the Erichsen deep-drawing value according to DIN 53,156 and the resistance to premium grade gasoline are determined for the hardened surface coating film (in each case after drying for 60 minutes at 80° C. and after drying for 4 days at room temperature); furthermore, the pot life of the ready-prepared surface coating mixtures is determined, this being the time which elapses before the solutions which have been brought to spray viscosity undergo gelling at 23° C.

grade gasoline, and at the same time possess pot lives which conform to processing requirements. Although the surface coatings obtained in Comparative Example 10 are very flexible, they do not possess adequate hardness, scratch-resistance and resistance to premium grade gasoline. The addition of large amounts of catalyst to the corresponding surface coating results in films which possess adequate hardness and flexibility but which in some cases are not sufficiently scratch-resistant and gasoline-resistant; the pot life (5 hours) of the resulting surface coating mixture no longer conforms to processing requirements (cf. Comparative Example 11). The films of Comparative Examples 12 and 13, obtained, respectively, without and with a catalyst, possess good final hardness, scratch-resistance and resistance to premium grade gasoline on the one hand, and completely inadequate flexibility on the other hand. Comparative Example 14 gives films which are sufficiently hard and very flexible but which possess only moderate scratch-resistance and inadequate gasoline-resistance, while the catalyzed formulation (Comparative Example 15) has much too short a pot life and gives films which are also not sufficiently resistant to premium grade gasoline.

We claim:

1. A process for the production of a coating based on a reaction product of
   (A) a polyhydroxypolyacrylate resin obtained from an ester of acrylic acid or methacrylic acid with a monofunctional aliphatic alcohol, or a mixture of

TABLE 3

| | | Properties of the white surface coating films | | | | | | | |
|---|---|---|---|---|---|---|---|---|---|
| | pot | | | | | Curing at room temperature | | | |
| Example | life** | Curing for 60 minutes at 80° C. | | | | 7 days | | | GR |
| No.* | (h) | PH (sec) | SR | ED (mm) | GR | PH (sec) | SR | ED (mm) | (after 4 days) |
| 1 | 23 | 157 | 0 | 7.2 | 0 | 145 | 0 | 7.5 | 0 |
| 2 | 22 | 153 | 0-1 | 8.0 | 0-1 | 140 | 0-1 | 8.0 | 0 |
| 3 | 18 | 153 | 0-1 | 8.5 | 0 | 138 | 0-1 | 9.2 | 0 |
| 4 | 25 | 158 | 0 | 7.8 | 0-1 | 140 | 0-1 | 8.3 | 0-1 |
| 5 | 25 | 158 | 0-1 | 7.9 | 0 | 145 | 0 | 8.0 | 0-1 |
| 6 | 26 | 162 | 0 | 8.4 | 0 | 135 | 0 | 7.8 | 0-1 |
| 7 | 23 | 160 | 0 | 8.0 | 0 | 143 | 0 | 8.2 | 1 |
| 8 | 22 | 165 | 0 | 7.7 | 0 | 150 | 0 | 7.5 | 0-1 |
| 9 | 23 | 157 | 0 | 8.6 | 0 | 145 | 0 | 9.6 | 0 |
| 10 | >50 | 90 | 3 | 10.4 | 5 | 65 | 3 | 10.5 | 5 |
| 11 | 5 | 153 | 1 | 4.8 | 1-2 | 115 | 3 | 8.5 | 3-4 |
| 12 | 45 | 164 | 0 | 2.9 | 0-1 | 148 | 0 | 1 | 1 |
| 13 | 20 | 158 | 0 | 3.8 | 0 | 151 | 0 | 1 | 0-1 |
| 14 | 50 | 131 | 2 | 8.9 | 3-4 | 135 | 2 | 8.3 | 3-4 |
| 15 | 7 | 155 | 1 | 5.8 | 2 | 161 | 1 | 6.0 | 2-3 |

*Examples 10 to 15 are Comparative Examples
**Time in hours until gelling of the surface coatings at spray viscosity (an efflux time of about 20 sec in DIN cup 4 at 23° C.)
Abbreviations:
PH: König pendulum hardness (sec), according to DIN 53,157
SR: Scratch-resistance, rating 0-5, according to DIN 53,230
ED: Erichsen deep-drawing value (mm), according to DIN 53,156
GR: Resistance to premium grade gasoline To test the resistance to premium grade gasoline, a ball of cottonwool impregnated with premium grade gasoline is allowed to act on the hardened surface coating film for 5 minutes, the cottonwool ball being covered with a glass dish during this time. The cottonwool ball is removed and the coating is then dried in the air for 35 minutes, after which evaluation is carried out (rating from 0 to 5, according to DIN 53,230).

The test results are summarized in Table 3. The pigmented surface coatings of Examples 1 to 9 and of Comparative Examples 10 to 15 give highly glossy smooth surface coating films. Table 3 shows clearly that the novel surface coating mixtures without added catalyst harden very rapidly to give very flexible, hard, scratch-resistant films having excellent resistance to premium esters of acrylic acid and methacrylic acid with monofunctional aliphatic alcohols, a monoester of acrylic acid with methacrylic acid with a polyfunctional aliphatic alcohol, or a mixture of monoesters of acrylic acid and methacrylic acid with polyfunctional aliphatic alcohols, and other copolymerizable oefinically unsatured monomers, with (B) a polyisocyanate which is unblocked or partially or completely blocked with CH—, NH— or OH-acidic blocking agents, contains isocyanurate groups and may or may not contain biuret groups and has a functionality of from 2.5 to 6, wherein the polyhydroxypolyacrylate resin (A) used comprises hydroxyl-containing copolymers consisting of (a) from 6 to 70% by weight of one or more esters of the formula

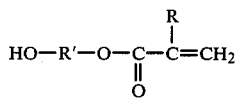

where R is hydrogen or methyl and R' is a straight-chain or branched alkylene radieal of 2 to 18 carbon atoms or alkylene of 7 to 17 carbon atoms which contains one, two or three cycloaliphatic groups, and some or all of the HO—R'—groups can be replaced by Z—O—R'—groups, where Z is a radical of the general formula

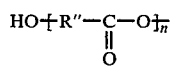

where n is an integer from 1 to 3 and R" is an alkylene chain of 4 to 8 carbon atoms which may additionally contain 1 to 3 alkyl substituents with a total of not more than 10 carbon atoms and/or a cycloaliphatic radical of 6 to 10 carbon atoms and/or an unsubstituted or alkyl-substituted aromatic radical of 6 to 8 carbon atoms and/or an araliphatic radical of 7 to 9 carbon atoms and/or an alkoxy radical of 1 to 8 carbon atoms, (b) from 0 to 50% by weight of one or more hydroxylalkyl esters of acrylic acid or methacrylic acid of the formula

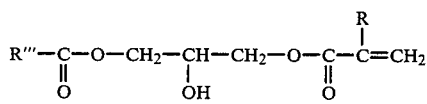

where R is hydrogen or methyl and R''' is the alkyl radical of a branched aliphatic carboxylic acid of 4 to 26 carbon atoms, (c) from 10 to 50% by weight of one or more alkyl esters of acrylic acid or methacrylic acid, which form homopolymers having a glass transition temperature of from $+5°$ to $+120°$ C., (d) from 0 to 10% by weight of a vinylaromatic, (e) from 10 to 60% by weight of one or more alkyl esters or alkylglycol esters of acrylic acid of methacrylic acid, which form homopolymers which have a glass transistion temperature of from $-80$ to $+4.5°$ C., the alkylglycol esters containing not more than 2 ether oxygen bridges, (f) from 0 to 10% by weight of an acrylamide or a methacrylamide which may or may not be substituted at the amide nitrogen by one or two alkyl radicals of 1 to 8 carbon atoms which may or may not contain a carbonyl group, or by one or two phenyl radicals, (g) from 1 to 25% by weight of one or more N-vinylimidazoles of the formula

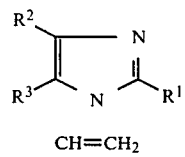

where $R^1$, $R^2$, and $R^3$ are each hydrogen, methyl, ethyl, a straight-chain or branched alkyl radical of 3 or 4 carbon atoms, or phenyl, (h) from 0 to 20% by weight of monomers which are not stated under (a) to (g) and whose copolymerized radicals ar inert to isocyanate groups, with the proviso that the sum of the percentages stated under (a) and (b) is from 6 to 70, the sum of the percentages stated under (c), (d) and (g) is from 11 to 60, and the sum of the percentages of the components stated under (a) to (h) is 100, and the polyisocyanate (B) used, which contains isocyanurate groups, may or may not contain biuret groups and has a functionality of from 2.5 to 6, comprises a mixture of (B1) from 60 to 99% by weight of an isocyanurate-containing polyisocyanate which possesses predominantly cycloaliphatically bonded isocyanate groups, and (B2) from 1 to 40% by weight of a polyisocyanate which contains biuret or isocyanurate groups or both biuret and isocyanurate groups and possesses predominantly aliphatically bonded isocyanate groups, the sum of the percentages stated under (B1) and (B2) being 100, and/or an isocyanurate-containing polyisocyanate which contains, as copolymerized units, (1) from 60 to 99% by weight of a diisocyanate possessing one or more cycloaliphatically bonded isocyanate groups, and (2) from 1 to 40% by weight of an aliphatic diisocyanate, the sum of the percentages stated under (1) and (2) being 100.

2. A process as defined in claim 1, wherein the cycloaliphatic isocyanurate-containing polyisocyanate (B1) used is a product obtained from 3-isocyanatomethyl-3,5,5-trimethylcyclohexyl isocyanate (isophorone diisocyanate) as the diisocyanate monomer.

3. A process as defined in claim 1, wherein a product obtained from hexamethylene diisocyanate, as the diisocyanate monomer, is used as the polyisocyanate (B2) which contains biuret groups and possesses predominantly aliphatically bonded isocyanate groups.

4. A process as defined in claim 1, wherein from 2 to 30% by weight of the biuret-containing polyisocyanate based on hexamethylene diisocyanate is used as component (B2).

5. A process as defined in claim 1, wherein a product obtained from hexamethylene diisocyanate, as the diisocyanate monomer, is used as the isocyanurate-containing polyisocyanate (B2) possessing predominantly aliphatically bonded isocyanate groups.

6. A process as defined in claim 1, wherein from 2 to 30% by weight of the isocyanurate-containing polyisocyanate based on hexamethylene diisocyanate is used as component (B2).

7. A process as defined in claim 1, wherein a product which contains, as copolymerized units, (1) from 60 to 99% by weight of isophorone diisocyanate and (2) from 1 to 40% by weight of hexamethylene diisocyanate is used as the isocyanurate-containing polyisocyanate (B)

possessing predominantly cycloaliphatically bonded isocyanate groups, with the proviso that the sum of the percentages stated under (1) and (2) is 100.

8. A process as defined in claim 7, wherein the polyisocyanate used contains, as copolymerized units, (1) from 70 to 98% by weight of isophorone diisocyanate and (2) from 2 to 30% by weight of hexamethylene diisocyanate, with the proviso that the sum of the percentages stated under (1) and (2) is 100.

9. A process as defined in claim 1, wherein the hydroxyl number of the hydroxyl-containing copolymer (A) is from 30 to 250.

10. A process as defined in claim 1, wherein the hydroxyl number of the hydroxyl-containing copolymer (A) is from 50 to 150.

11. A process as defined in claim 1, wherein hydroxyethyl acrylate, hydroxyethyl methacrylate, 2-hydroxypropyl acrylate or 2-hydroxypropyl methacrylate, or a mixture of these compounds, is used as component (a) of the hydroxyl-containing copolymer.

12. A process as defined in claim 1 wherein butane-1,4-diol monoacrylate, butane-1,4-diol monomethacrylate, hexane-1,6-diol monoacrylate or hexane-1,6-diol monomethacrylate, or a mixture of these compounds, is used as component (a) of the hydroxyl-containing copolymer.

13. A process as defined in claim 1, wherein component (a) of the hydroxyl-containing copolymer is a reaction product of one or more compounds from the group consisting of hydroxyethyl acrylate, hydroxyethyl methacrylate, 2-hydroxypropyl acrylate, 2-hydroxypropyl methacrylate, butane-1,4-diol monoacrylate, butane-1,4-diol monomethacrylate, hexane-1,6-diol monoacrylate and hexane-1,6-diol monomethacrylate with ε-caprolactone which is unsubstituted or substituted by 1 to 3 alkyl radicals possessing a total of not more than 10 carbon atoms, the reactants being used in a molar ratio of from 1.5:1 to 1:3.

14. A process as defined in claim 13, wherein component (a) of the hydroxyl-containing copolymer is a reaction product of one or more compounds of the group consisting of hydroxyethyl acrylate, hydroxyethyl methacrylate, 2-hydroxypropyl acrylate, 2-hydroxypropyl methacrylate, butane-1,4-diol monoacrylate and butane-1,4-diol monomethacrylate with ε-caprolactone, the reactants being used in a molar ratio of from 1.5:1 to 1:3.

15. A process as defined in claim 1, wherein a mixture of from 1 to 99% by weight of the reaction products stated in claim 13 with from 99 to 1% by weight of hydroxyethyl acrylate, hydroxyethyl methacrylate, butane-1,4-diol monoacrylate, butane-1,4-diol monomethacrylate or a mixture of these compounds is used as component (a) of the hydroxyl-containing copolymer.

16. A process as defined in claim 1, wherein from 2 to 20% by weight of component (g) is used for the hydroxyl-containing copolymer.

17. A process as defined in claim 1, wherein the ratio of the reactants (A) and (B) is chosen so that the ratio of the number of equivalents of isocyanate groups which are unblocked or partially or completely blocked with CH—, NH— or OH—acidic blocking agents to the number of equivalents of reactive hydroxyl groups is from 0.25:1 to 4:1.

18. A process as defined in claim 1, wherein a monofunctional ketoxime is used as the blocking agent for the partially or completely blocked polyisocyanate.

19. A process as defined in claim 1, wherein dimethyl ketoxime or methyl ethyl ketoxime is used as the blocking agent for the polyisocyanate.

20. A process as defined in claim 1, wherein a mixture of from 1 to 99% by weight of the reaction products stated in claim 14 with from 99 to 1% by weight of hydroxyethyl acrylate, hydroxyethyl methacrylate, butane-1,4-diol monoacrylate, butane-1,4-diol monomethyacrylate or a mixture of these compounds is used as component (a) of the hydroxyl-containing copolymer.

* * * * *

UNITED STATES PATENT AND TRADEMARK OFFICE
CERTIFICATE OF CORRECTION

PATENT NO. : 4,687,813

DATED : August 18, 1987

INVENTOR(S) : Werner LENZ et al.

It is certified that error appears in the above-identified patent and that said Letters Patent is hereby corrected as shown below:

IN THE CLAIMS:

Column 23, line 14 [radieal]
should be: radical

Column 23, line 55 of acrylic acid [of]
should be of acrylic acid or

Column 23, line 57 [transistion]
should be transition

Column 24, line 14 radicals[ar] inert
should be:
radicals are inert

Column 25 line 38 by 1 to [3alkyl]
should be:
by 1 to 3 alkyl

Signed and Sealed this

Twelfth Day of January, 1988

*Attest:*

DONALD J. QUIGG

*Attesting Officer*   *Commissioner of Patents and Trademarks*